Dec. 10, 1963 E. L. KING ETAL 3,113,330
TAP HAVING A LEADING ROUGH CUTTING PORTION FOLLOWED
BY A FINISH CUTTING PORTION ON EACH CUTTING TOOTH
Filed June 27, 1960
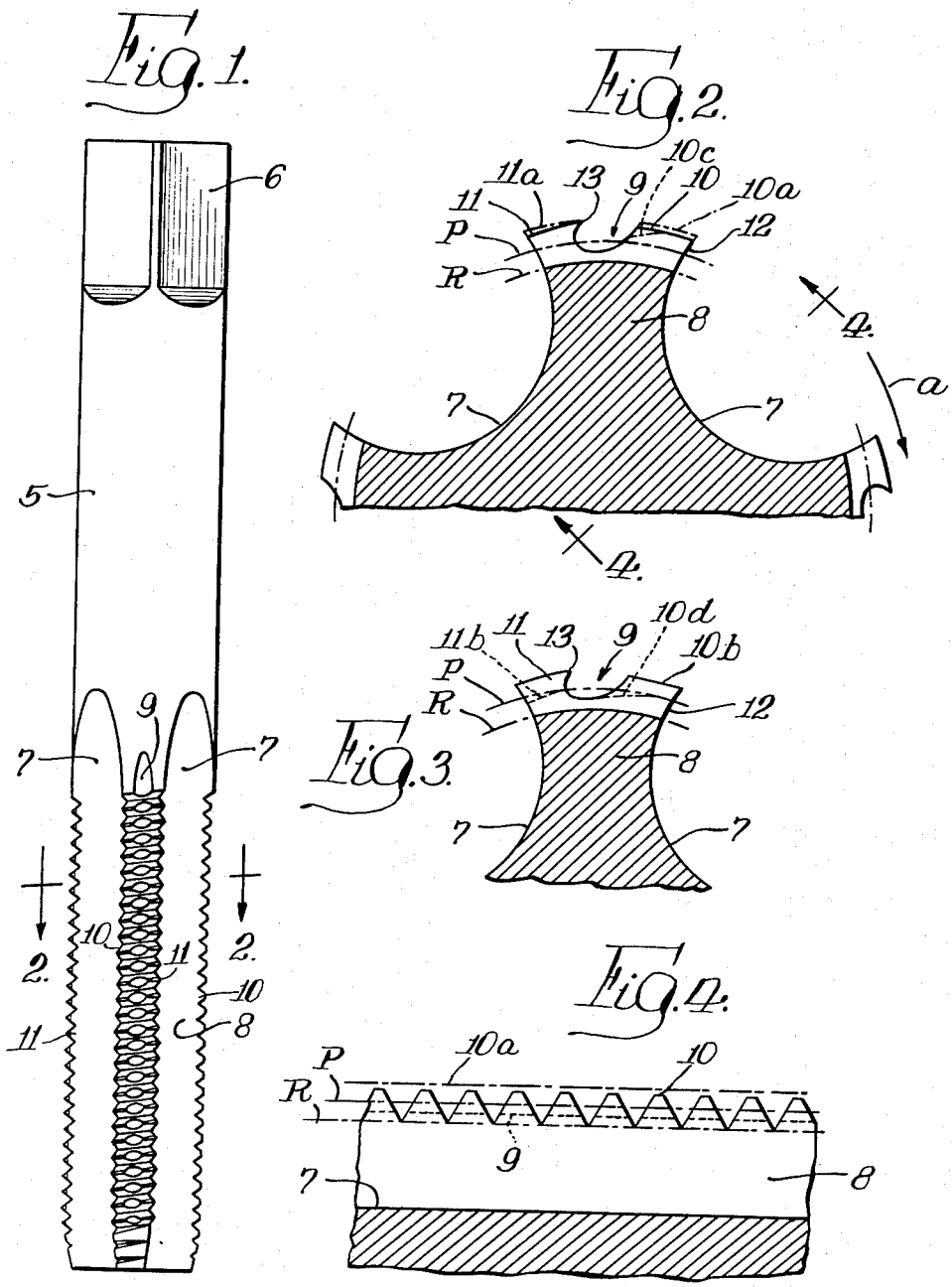
INVENTORS.
Everett L. King,
James L. Wishart,
By Brown, Jackson, Boettcher
& Dienner,
Atty's.

United States Patent Office 3,113,330
Patented Dec. 10, 1963

3,113,330
TAP HAVING A LEADING ROUGH CUTTING PORTION FOLLOWED BY A FINISH CUTTING PORTION ON EACH CUTTING TOOTH
Everett L. King, Lyndon, and James L. Wishart, Lyndonville, Vt., assignors to Vermont American Corporation, a corporation of Kentucky
Filed June 27, 1960, Ser. No. 38,942
7 Claims. (Cl. 10—141)

This invention relates to threading tools, particularly screw taps for cutting internal screw threads.

Screw taps are well known and extensively used. In using the known conventional or standard taps it often is difficult to assure proper guidance and the production of a smooth and accurately finished thread, particularly in hard or difficult cutting material. Our invention is directed to a tap having lands respectively comprising a leading roughing section and a following finishing section and associated features which facilitates accurate guidance, reduce friction, assure a smoothly cut thread and contribute to the tap life and size consistency. Further objects and advantages of our invention will appear from the detail description.

In the drawings:

FIGURE 1 is a side view of a tap embodying our invention;

FIGURE 2 is a fragmentary sectional view, on an enlarged scale, taken substantially on line 2—2 of FIGURE 1;

FIGURE 3 is a view similar to FIGURE 2, but showing a modification; and

FIGURE 4 is a fragmentary sectional view, on an enlarged scale, taken substantially on line 4—4 of FIGURE 2.

The tap of our invention comprises a body portion 5 having at one end a squared element 6 to be grasped in a suitable tool or chuck and having its other end portion tapered; as is known. The body portion 5 is provided with lengthwise flutes 7 defining between them lengthwise lands 8 provided with helically arranged cutting teeth, the flutes being at least as wide as the lands therebetween and several times deeper than the height of the cutting teeth on said lands (FIGURE 2, for example). Each land has formed therein a lengthwise groove 9 disposed centrally of land 8 and of a width equal to one third of the radially outer face of land 8. Groove 9 separates the teeth into two sections—a leading roughing section 10 and a following finishing section 11—each of approximately the same width and equal in width to the groove 9.

The following side of the respective flutes 7 provides a hook element 12 at the leading or cutting edges of the roughing tooth portions or sections 10, the cutting edges of which are thus inclined outwardly at an appropriate angle in the direction of rotation of the tap in use, indicated by the arrow $a$ in FIGURE 2. The groove 9 is of a depth extending at least to the pitch line "P" of the tooth sections 10 and 11, preferably extending to a depth midway between the pitch line "P" and the root line "R," respectively corresponding to the pitch diameter and the root diameter of the teeth. The groove 9 is so formed that its following side provides a hook element 13 at the leading or cutting edges of the finishing tooth portions or sections 11 such that the cutting edges thereof are inclined outwardly in the direction of rotation of the tap in use at the same angle as the cutting edges of the tooth sections 10.

The radial extent or height of the leading or roughing tooth sections 10 is ground down or otherwise suitably reduced relative to the following or finishing sections 11. In FIGURE 2 the extent of reduction in height of the tooth section 10 is the distance between the broken line 10a, indicating the original crest of section 10 and the full line showing the crest of reduced section 10. It will be noted that the tooth section 10 has been ground down or reduced concentrically with the land 8. While that is preferred, it is not essential, and the tooth sections 10 may be reduced in height by being ground flat or straight, as shown at 10b in FIGURE 3, in smaller sized taps up to about 7/16″. The extent of reduction in height of the tooth sections 10 may vary from about .001″ to .005″, depending upon the tap size.

Under certain conditions, as when the material is hard or difficult to thread, it may be desirable to provide relief. Radial relief for the following or finishing tooth sections 11 may be provided by progressively reducing the radial extent or height of section 11 from its cutting edge to its heel. In FIGURE 2 the broken line 11a indicates the original crest of tooth section 11 and the full line is the relieved crest thereof, from which it will be seen that the height of tooth section 11 has been progressively reduced from its cutting edge to its heel. Alternatively, radial relief for the following tooth sections 11 may be provided by grinding the sides of the tooth elements thereof, at their heel portions, to below the pitch line P, as indicated by the broken line 11b in FIGURE 3.

It may also be desirable, in exceptional cases, to provide clearance for the leading tooth sections 10. That may be accomplished by grinding down or reducing the heel portions of sections 10, as indicated by the broken line 10c of FIGURE 2, or by grinding down or reducing the sides of the tooth elements thereof, at their heel portions, to below the pitch line P, as indicated by the broken line 10d of FIGURE 3.

In the drawings, the extent of radial reduction of the leading tooth sections 10, and the extent of the clearances indicated, have been exaggerated in the interest of clearness of illustration, as will be understood.

Ordinarily, it is not necessary to provide the tap of our invention with radial relief, as above indicated. Accordingly, while desirable in certain cases, the provision of radial relief is not essential to the broader aspects of our invention, as will be understood. The provision of the lands 8 with the grooves 9 in conjunction with the tooth portions or sections 10 and 11 and associated elements, disposed and related as above described, assures accuracy and reduced friction in the threading or tapping operation, with resultant production of a smooth and accurately formed thread, the reduction in friction also contributing to the tap life and size consistency.

It will be understood, as above indicated, that variations in detail may be resorted to without departing from the field and scope of our invention, and we intend to include all such variations, as fall within the scope of the appended claims, in this application in which the preferred forms only of our invention have been disclosed.

We claim:

1. A screw tap having a plurality of lengthwise lands provided with helically arranged cutting teeth projecting from a common root diameter and intervening lengthwise flutes of a width at least as great as that of the lands and extending to a depth substantially greater than the root of the teeth provided said lands, each said lands having a lengthwise central groove narrower than the flutes and extending from the crests of the teeth inward to intermediate the pitch line and root diameter of the teeth, said grooves dividing the teeth of each land into a leading rough cutting section and a following finish cutting section having common flanks, the rough cutting section having a truncated crest, and the crest of the following finish cutting section being of greater radial height than that of the leading rough cutting section.

2. A screw tap as claimed in claim 1 wherein the groove has a width approximately one-third of the width of said land, the rough cutting and finish cutting sections having respectively the same width as that of the groove.

3. A screw tap as claimed in claim 1 wherein the leading rough cutting section has its crest ground concentrically with the land to below the radial height of the crest of the following finish cutting section.

4. A screw tap having a plurality of lengthwise lands provided with helically arranged cutting teeth projecting from a common root diameter and intervening lengthwise flutes of a width at least as great as that of the respective lands and which extend to a depth substantially greater than the root of said teeth, said teeth of said lands respectively comprising a leading rough cutting section and a following finish cutting section having common flanks, said rough cutting section of each tooth being of less radial height than the finish cutting section of said tooth.

5. A screw tap having a plurality of lengthwise lands provided with helically arranged cutting teeth projecting from a common root diameter and intervening flutes which are at least as wide as the lands and extend deeper than the root of the teeth thereon, said lands respectively having a lengthwise central groove therein which is narrower than the flutes and extend from the crests of said teeth inward to at least the pitch line thereof but not to the root diameter, said central groove separating said land into a leading rough cutting section and a trailing finish cutting section having common flanks, the leading rough cutting section having a radial height less than the radial height of the trailing finish cutting section, and the trailing section having a radial height at its heel less than that of its leading edge at said groove.

6. A screw tap having a plurality of lengthwise lands provided with helically arranged cutting teeth projecting from a common root diameter and intervening lengthwise flutes which are at least as wide as the lands and extend deeper than the root of the cutting teeth thereon, said lands respectively having a lengthwise central groove therein that is narrower than the flutes and extend from the crests of said teeth inward to at least the pitch line thereof but not beyond the root diameter thereof, said central groove thereof separating each land into a leading rough cutting section and a trailing finish cutting section having common flanks, the trailing finish cutting section having a radial height greater than that of the leading rough cutting section, the leading edge of the land being inclined outwardly to comprise a hook element, and the groove undercutting the trailing section, said trailing section thereby having its leading edge similarly inclined to comprise a hook element.

7. The screw tap of claim 6 wherein at least the trailing finish cutting section of each said lands has radial back relief.

References Cited in the file of this patent

UNITED STATES PATENTS

| 194,469 | Schaub | Aug. 21, 1877 |
| 700,892 | Blackburn | May 27, 1902 |

FOREIGN PATENTS

| 21,817 | Great Britain | Feb. 13, 1908 |
| 305,950 | Great Britain | Feb. 20, 1930 |

OTHER REFERENCES

Automatic Machining, pages 46, 47, July 1957. (Copy in Div. 57.)